(12) United States Patent
Taguchi

(10) Patent No.: US 6,222,621 B1
(45) Date of Patent: Apr. 24, 2001

(54) SPECTACLE LENS EVALUATION METHOD AND EVALUATION DEVICE

(75) Inventor: Shinichiro Taguchi, Tokyo (JP)

(73) Assignee: Hoyo Corporation, Tokyo (JP)

( * ) Notice: Subject to any disclaimer, the term of this patent is extended or adjusted under 35 U.S.C. 154(b) by 0 days.

(21) Appl. No.: 09/414,419

(22) Filed: Oct. 8, 1999

(51) Int. Cl.[7] .................................................. G01B 9/00
(52) U.S. Cl. ............................ 356/124; 356/127; 351/169
(58) Field of Search ................................. 356/124, 125, 356/126, 127; 351/169, 177, 168, 170–172

(56) References Cited

U.S. PATENT DOCUMENTS

| | | | |
|---|---|---|---|
| 3,645,610 | * 2/1972 | Duckwall et al. | 351/176 |
| 3,960,442 | 6/1976 | Davis et al. | |
| 4,007,990 | 2/1977 | McDevitt, Jr. et al. | |
| 4,275,964 | 6/1981 | Vassiliadis | |
| 5,007,734 | * 4/1991 | Wilms | 356/124 |
| 5,182,443 | * 1/1993 | Suda et al. | 250/201.2 |
| 5,394,741 | 3/1995 | Kajimura et al. | |
| 5,416,574 | 5/1995 | Fantone | |
| 5,708,492 | * 1/1998 | Kitani | 351/169 |
| 6,019,470 | 2/2000 | Mukaiyama et al. | |
| 6,135,597 | * 10/2000 | Minato | 351/216 |

FOREIGN PATENT DOCUMENTS

| | | |
|---|---|---|
| 0 718 645 A2 | 6/1996 | (EP) . |
| 8-304228 | 11/1996 | (JP) . |
| 10-507825 | 7/1998 | (JP) . |
| 11-125580 | * 5/1999 | (JP) . |
| 11-094700 | 9/1999 | (JP) . |
| WO 99/05500 | 2/1999 | (WO) . |

OTHER PUBLICATIONS

Yoshimoto, Fujishi et al., *Spline Function And Its Application*, vol. 5, Feb. 1, 1985, Kyoiku Shuppan, etc.

* cited by examiner

*Primary Examiner*—Hoa Q. Pham
(74) *Attorney, Agent, or Firm*—Oliff & Berridge, PLC

(57) ABSTRACT

The optimum optical properties of a spectacle lens that correspond with the state in which the spectacle lens is worn by respective wearers are found and evaluated. Three-dimensional shape data of the spectacle lens comprising the determinations of a three-dimensional determination device that determines the surface shape f the spectacle lens, parameters of the state in which the spectacle lens is worn, such as the distance from the center of rotation, and material parameters, such as the refractive index of the spectacle lens, are input to a computer that calculates optical properties of a spectacle lens. An optical model of the state in which the spectacle lens is worn is constructed by the computer based on these input data and optical properties at each position on the spectacle lens relating to the principal ray, or the beam comprising the principal ray, in the direction of the line of vision that passes through the center of rotation of the eyeball is calculated by this optical model and the calculation results are output to a printer, etc.

18 Claims, 11 Drawing Sheets

Forward inclination 7°

Forward inclination zero

Rotation center distance 34mm

Rotation center distance 27mm

Rotation center distance 20mm

S power distribution

C power distribution

S power distribution

C power distribution

FIG.17

| Angle of rotation (Deg) | S(Dptr) | C(Dptr) | AX(Deg) |
|---|---|---|---|
| −45.00 | 8.13 | −4.29 | 93.64 |
| −40.00 | 7.30 | −2.34 | 94.75 |
| −35.00 | 7.07 | −1.68 | 90.88 |
| −30.00 | 6.73 | −1.12 | 90.47 |
| −25.00 | 6.41 | −0.81 | 80.11 |
| −20.00 | 6.08 | −0.74 | 67.00 |
| −15.00 | 5.70 | −0.66 | 61.12 |
| −10.00 | 5.23 | −0.50 | 55.85 |
| −5.00 | 4.79 | −0.31 | 51.89 |
| 0.00 | 4.44 | −0.19 | 49.05 |
| 5.00 | 4.13 | −0.06 | 28.30 |
| 10.00 | 4.08 | −0.10 | 114.39 |
| 15.00 | 4.10 | −0.19 | 84.09 |
| 20.00 | 3.99 | −0.18 | 75.26 |
| 25.00 | 4.06 | −0.37 | 89.71 |
| 30.00 | 4.16 | −0.54 | 85.72 |
| 35.00 | 4.21 | −0.66 | 83.28 |
| 40.00 | 4.30 | −0.81 | 91.80 |
| 45.00 | 4.87 | −1.90 | 90.63 |

SPECTACLE LENS EVALUATION METHOD AND EVALUATION DEVICE

BACKGROUND OF THE INVENTION

1. Field of the Invention

The present invention pertains to an evaluation method and an evaluation device for evaluating the optical properties of a spectacle lens, and in particular, to a spectacle lens evaluation method and evaluation device with which optical properties can be found taking into consideration the state in which the spectacle lens is worn and the direction of the line of vision of the eye.

2. Description of the Related Art

Spectacle lenses are produced and finished in accordance with the optimized specifications of designers, and lens meters are used to evaluate the properties of a finished spectacle lens. Determination with a lens meter involves projecting parallel light beams perpendicular to the lens surface and determining lens power, etc. Moreover, lens meters that determine the addition are also known. Determinations with these lens meters are usually determinations at a spot on the lens. In contrast to this, devices that determine optical properties over a wide region on the lens have recently been presented (for example, refer to Japanese National Publication No. Hei 10-507825 and Japanese Laid-Open Patent No. Hei 8-304228).

Incidentally, it is necessary to take into consideration the differences from conventional optical systems (cameras and telescopes) when evaluating the optical properties of a spectacle lens. That is, it is possible to project people to be photographed over a wide range all at once on the film surface with a conventional optical system, such as a camera, but when the eye looks over a wide range, the eyeball captures the object as it turns around its center of rotation (eyeball movement) and moves its line of vision. This is why not all objects reflected on the retina of the eye are perceived as clear objects and only the narrow region at the fovea with high resolution can be clearly seen.

On the other hand, it is not possible to determine the light rays or light beams in the direction of the field of vision that pass through the center of rotation of the eyeball other than on the optical axis of the spectacle lens, and the refractive index of the apex in the direction of the field of vision that passes through the periphery of the spectacle lens, etc., cannot be correctly determined with a lens meter.

SUMMARY OF THE INVENTION

The present invention is based on the above-mentioned background, its objective being to present an optical lens evaluation method and evaluation device with which it is possible to find optimum spectacle lens optical properties in accordance with the state in which the spectacle lens is worn by each wearer taking into consideration the state in which the spectacle lens is worn and the direction of the line of vision of the eye.

In order to accomplish the above-mentioned objective, the method of evaluating a spectacle lens of the present invention is characterized in that it comprises the steps of finding the optical properties of each position on a spectacle lens relating to the principal ray , or beam that comprises the principal ray, that passes through the center of rotation of the eyeball from the three-dimensional data of the spectacle lens, the parameters for the state in which the spectacle lens is worn comprising distance from the surface of said spectacle lens on the eye side to the center of rotation of the eyeball, and the material parameters of the spectacle lens comprising the index of refraction of said spectacle lens as a parameter, and evaluating the spectacle lens.

That is, in order to realize the optimum optical design for spectacle lens, it is necessary to evaluate optical properties at each position (the center as well as around the periphery of the lens) of spectacle lenses with respect to the principal ray or beam in the direction of the field of vision that passes through the center of rotation of the eyeball of various types of monofocal and bifocal lenses, particularly, progressive multifocal lenses.

Moreover, it is necessary to take into consideration the state in which the spectacle lens is worn, that is, the position relationship between the spectacle lens and the eyeball, particularly the position relationship of the spectacle lens with respect to the center of rotation of the eyeball. Moreover, not only the distance from the center of rotation, but also decentering, prism prescription, forward inclination of the spectacle lens, etc., which are other factors of the state in which the spectacle lens is worn, vary from individual to individual depending on the wearer's prescription, the spectacle frames being worn, etc. Consequently, in order to more correctly evaluate optical properties of spectacle lenses, it is necessary to construct an "optical model for when a spectacle lens is worn" that uses various factors of the state in which the spectacle lens is worn, such as the above-mentioned distance from the center of rotation.

On the other hand, the use of mechanical optical devices and equipment with which it is possible to change as needed the relative position relationship of the spectacle lens with respect to the center of rotation of the eyeball is considered so that it is possible to more accurately determine optical properties of the state in which the spectacle lens is worn. Nevertheless, by means of this type of mechanical optical device it becomes necessary to re-measure the same spectacle lens every time the values of each parameter for the state in which the spectacle lens is worn, such as the distance from the center of rotation, etc., are changed, or it is necessary to move the spectacle lens to many determination positions and then measure the lens when the distribution of the refractive index of the optical lens is being determined, etc. Thus, a considerable amount of time is needed.

The state in which the spectacle lens is worn, that is, the position relationship of the spectacle lens with the center of rotation of the eyeball (optical model for when the spectacle lens is worn), is determined from three-dimensional shape data of the spectacle lens and parameters for the state in which the spectacle lens is worn comprising the distance between the surface of the spectacle lens on the eye side and the center of rotation of the eyeball as parameter, and optical properties at each position on the spectacle lens relating to the principal ray, or the beam that comprises the principal ray, in the direction of the field of vision that passes through the center of rotation of the eyeball is found from this relationship. That is, one characteristic of the present invention is that the distance between the surface of the spectacle lens on the eye side and the center of rotation of the eyeball is treated as a parameter, not a fixed element. Thus, It is possible to more accurately confirm real optical properties when the spectacle is actually worn by the spectacle wearer. In other words, the present invention focuses on fact that the distance between the surface of the spectacle lenses on the eye side and the center of the rotation of the eyeball generally differs with the spectacle wearer and the fact that when this distance is different, real optical properties as seen through the eye are so different that they cannot be disregarded, even when the optical properties of the spectacle lens itself are the same. By using this distance as a parameter, it is possible to accurately find the real optical properties when a spectacle is actually worn by a spectacle wearer, even if the above-mentioned distance varies, by, for instance, using computer simulation, etc. Further, the present invention similarly uses factors other than the above-mentioned distance that vary depending on how the spectacle is worn as a parameter of the state in which the spectacle is worn. In addition, factors that can change with the shape of the face of the wearer and fashion, etc., serve as material parameters. The real optical properties of the entire lens when the spectacle is actually worn by the spectacle wearer can be more accurately found from these parameters and three-dimensional shape data because many factors that can vary are taken into consideration.

By means of the above-mentioned method of evaluating a spectacle lens, at least the distance between the surface of the spectacle lens on the eye side and the center of rotation of the eyeball is included among the parameters for state in which the spectacle lens is worn, but it is preferred that these parameters also include decentering, prism prescription, and forward inclination of the spectacle lens. This is preferred because it is possible to obtain an evaluation that accurately corresponds to the prescription of the wearer and state in which the spectacle lens is worn comprising the shape of the spectacle frame being worn, etc.

Moreover, it is preferred that the determinations of three-dimensional shape of the spectacle lens as measured with a contact-type three-dimensional determination device that uses Atomic Force Probe be used for the three-dimensional shape data of the spectacle lens. This is preferred because high-accuracy determination is possible with a contact-type three-dimensional determination device that uses Atomic Force Probe, and the spectacle lens will not be scratched by a probe. However, the determinations of 3-dimensional shape data of the spectacle lens are not limited to a contact-type 3-dimensional determination device that uses Atomic Force Probe, and an interferometer or non-contact 3-dimensional determination device can also be used.

In addition, the surface shape of the spectacle lens of the three-dimensional shape data of the spectacle lens should be converted to a spline function. This is because there are advantages in that the spectacle lens surface can be appropriately approximated with the spline function and the point of intersection of the spectacle lens surface and light ray can be easily found when finding the optical properties of the lens, etc. Optical properties at each position on the spectacle lens are found by ray tracing the principal ray, or the beam comprising this principal ray, that passes through the center of rotation of the eyeball.

The spectacle lens evaluation device of the present invention comprises a three-dimensional determination device that determines the surface shape of the spectacle lens, a computer that calculates the optical properties of the spectacle lens from various data of said spectacle lens, and an output device that displays the results of evaluating optical properties of the spectacle lens that have been calculated by the computer, wherein the above-mentioned computer has a three-dimensional shape data input part that inputs data relating to the three-dimensional shape of the spectacle lens comprising the determination of said three-dimensional determination device, a part for inputting parameters of state in which the spectacle lens is worn comprising the distance between the surface of said spectacle lens on the eye side and the center of rotation of the eyeball as a parameter, and a material parameter input part that inputs material parameters of the spectacle lens comprising the refractive index of said spectacle lens as a parameter, as well as a processing part that calculates optical properties at each position on the spectacle lens relating to the principal ray, or the beam comprising the principal ray, that passes through the center of rotation of said eyeball based on data from these input parts.

It is preferred that the three-dimensional determination device of the above-mentioned spectacle lens evaluation device be a contact-type three-dimensional determination device that uses Atomic Force Probe. Moreover, it is preferred that the processing part have a function processing part that converts the surface shape of the spectacle lens from the input from the three-dimensional shape data input part to a spline function. Furthermore, it is preferred that the processing part have a coordinate transformation processing part that transforms coordinates for modification of the relative position relationship between the light rays and the spectacle lens when optical properties are found at each position on the spectacle lens by ray tracing a principal ray, or a beam comprising a principal ray, that passes through the center of rotation of the eyeball.

BRIEF DESCRIPTION OF THE DRAWINGS

FIG. 17 is a table showing the numeric data from calculating optical properties of a progressive multifocal lens.

DEFINITION OF SYMBOLS

Figure 1:
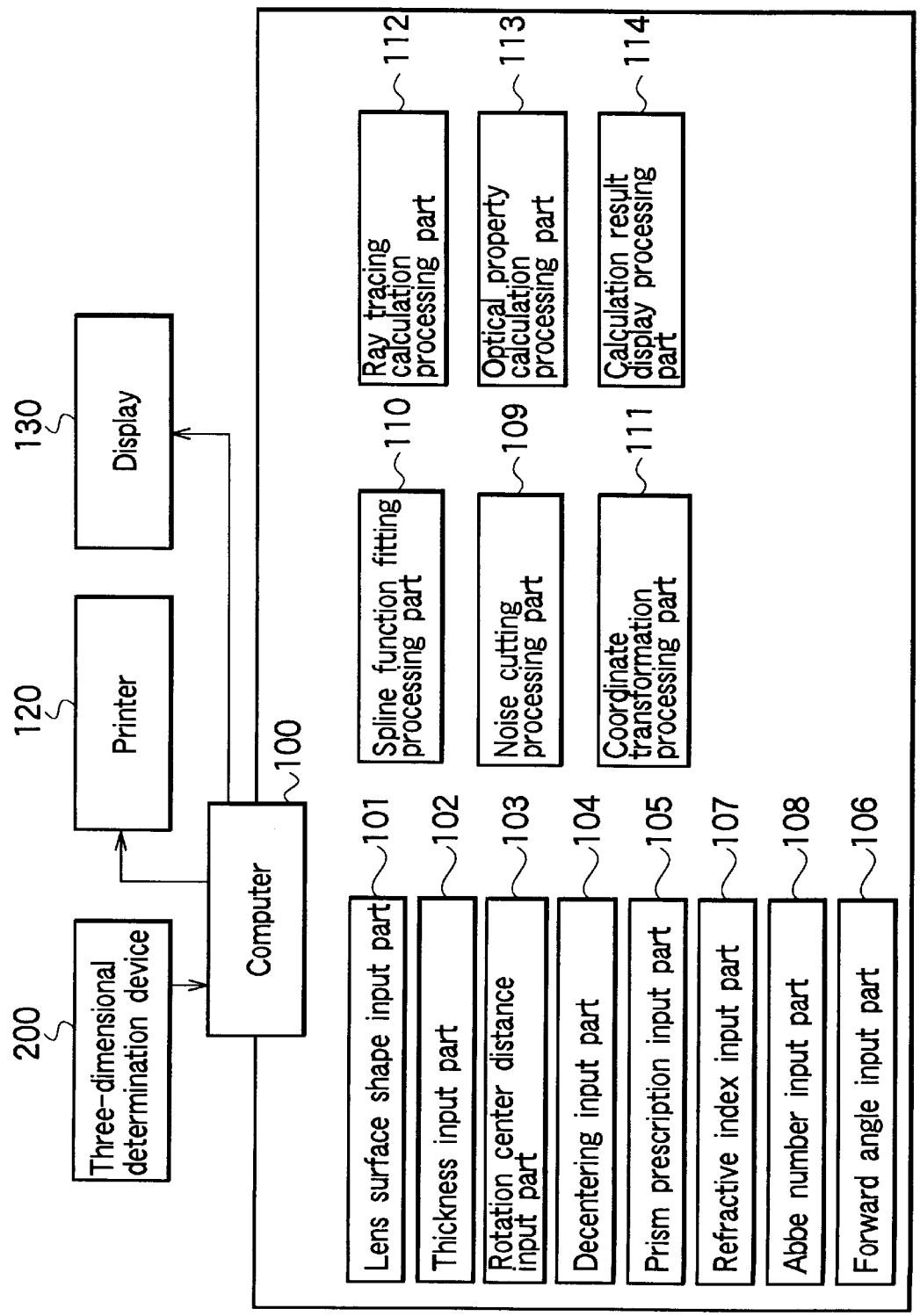
FIG. 1 is a schematic diagram showing one embodiment of the spectacle lens evaluation device of the present invention.

1. Spectacle lens
1a. Convex surface
1b. Concave surface
2. Eyeball
100. Computer
101. Lens surface shape input part
102. Thickness input part
103. Rotation center distance input part
104. Decentering input part
105. Prism input part
106. Forward inclination input part
107. Refractive index input part
108. Abbe number input part
109. Noise cutting processing part
110. Spline function input part
111. Coordinate transformation processing part
112. Ray tracing calculation processing part
113. Optical property processing part
114. Calculation result display processing part
120. Printer
130. Display
R Center of rotation
VR Distance from the center of rotation
CT Center thickness of spectacle lens

DESCRIPTION OF THE PREFERRED EMBODIMENTS

Embodiments of the present invention are described below using figures. FIG. 1 is a schematic diagram showing an example of the spectacle lens evaluation device of the present invention. This evaluation device is equipped with three-dimensional determination device 200 that determines the surface shape of the spectacle lens, computer 100 that calculates optical properties of the spectacle lens from the various data of the spectacle lens, and output devices (printer 120 and display 130) that display the results of evaluation of optical properties of the spectacle lens that have been calculated by computer 100.

Computer 100 has lens surface shape input part 101, which inputs the determination from three-dimensional determination device 200, and thickness input part 102, which inputs thickness at the geometric center of the spectacle lens determined with a thickness gauge (not illustrated), as the three-dimensional shape data input parts that input data pertaining to the three-dimensional shape of a spectacle lens comprising determinations from three-dimensional determination device 200. Moreover, it has rotation center distance input part 103, which inputs the center from the distance of declination between the surface of the spectacle lens on the eye side and the center of rotation of the eyeball, decentering input part 104, which inputs the amount of decentering of the spectacle lens, prism prescription input part 105, which inputs the prism prescription, and forward inclination input part 106, which inputs forward inclination of the spectacle lens, as the input parts that input parameters of the state in which the spectacle lens is worn. It further has refractive index input part 107, which inputs the refractive index of the spectacle lens, and Abbe number input part 108, which inputs the Abbe number of the spectacle lens, as the material parameter input parts that input material parameters of the spectacle lens.

The computer also has noise cutting processing part 109, which cuts the noise contained in the determinations that have been input from three-dimensional determination device 200 to lens surface shape input part 101, spline function fitting processing part (function processing part) 110, which converts the lens surface shape data from lens surface shape input part 101 to a spline function, and coordinate transformation processing part 111, which transforms the coordinate position of the lens surface, etc. The computer further has ray tracing and calculation processing part 112, which ray traces the principal ray that passes through the center of rotation of the eyeball and the rays in the vicinity of this principal ray when the spectacle lens is worn based on data from the above-mentioned input part and processing parts, optical property calculation processing part 113, which calculates the optical properties of the spectacle lens from the results of this ray tracing and calculation, and a calculation result display processing part that processes the results of the optical property calculations so that they can be output to printer 120 and display 130.

Figure 2:
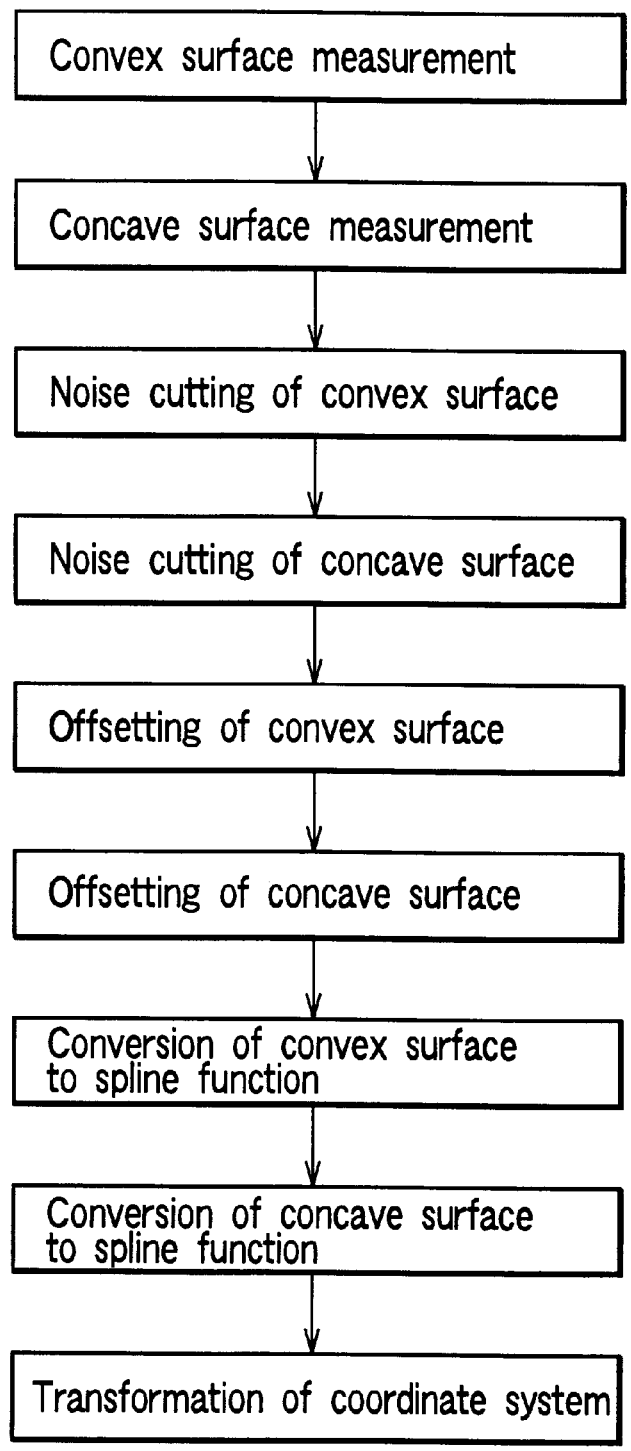
FIG. 2 is the flow chart showing three-dimensional shape determination and pre-processing before optical property calculation of a spectacle lens.

Next, determination of the three-dimensional shape of the spectacle lens will be explained. Surface shape of the spectacle lens was determined by above-mentioned 3-dimensional determination device 200. This will be explained in accordance with FIG. 2, which shows the flow of three-dimensional shape determination and pre-processing before optical property calculation. First, surface shape of the convex surface (surface of the lens on the object side) and the concave surface (surface of the lens on the eye side) of a spectacle lens is determined. A contact-type 3-dimensional determination device that uses Atomic Force Probe (Ultra-High Precision Three-Dimensional Determination Device UA3P made by Matsushita Denki Sangyo Co., Ltd.) was used for the three-dimensional determination device. The determination data usually contains noise, but noise with a high error level (dust adhering to the lens, etc., that is clearly noise) is pre-treated because noise with a high error level becomes a factor that impedes adequate evaluation. This processing is performed by noise cut processing part 109 of the above-mentioned computer. Moreover, in the case of a contact-type 3-dimensional determination device, there are point groups of coordinates at the center position of the probe and therefore, offset processing is performed to bring out the surfaces that are convex or concave when the determination data of the convex and concave surfaces have not been specially treated on the determination device side.

Next, each of the determination data for the convex and concave surfaces that have been submitted to noise-cutting processing and offset processing are converted to a spline function by the above-mentioned spline function fitting processing part 110. The determination data are in many point groups, but because differential values are needed during ray tracing, etc., it is preferred that the determinations be converted to a function in order to stabilize the calculations. The generally known spline function is an appropriate function that is used at this time. When necessary, the NURBS, etc., function can also be used.

Moreover, the spectacle lens is turned 180° (lens surface is reversed) and set on the determination head part when the concave surface is measured after measuring the convex surface of the spectacle lens and therefore, the coordinate system has been turned 180° in the determination data for the convex surface and the concave surface. Thus, the same coordinate system can be used by reversing (turning 180°) either the convex surface data or the concave surface data.

This coordinate transformation is performed by above-mentioned coordinate transformation processing part lll and the generally known affine transformation is used.

Moreover, thickness at the geometric center of the spectacle lens was measured using a thickness gauge (SONY U30), etc. The three-dimensional shape data of the convex surface and concave surface of the spectacle lens is obtained from the above-mentioned lens surface shape that has been converted to a spline function.

Figure 3:
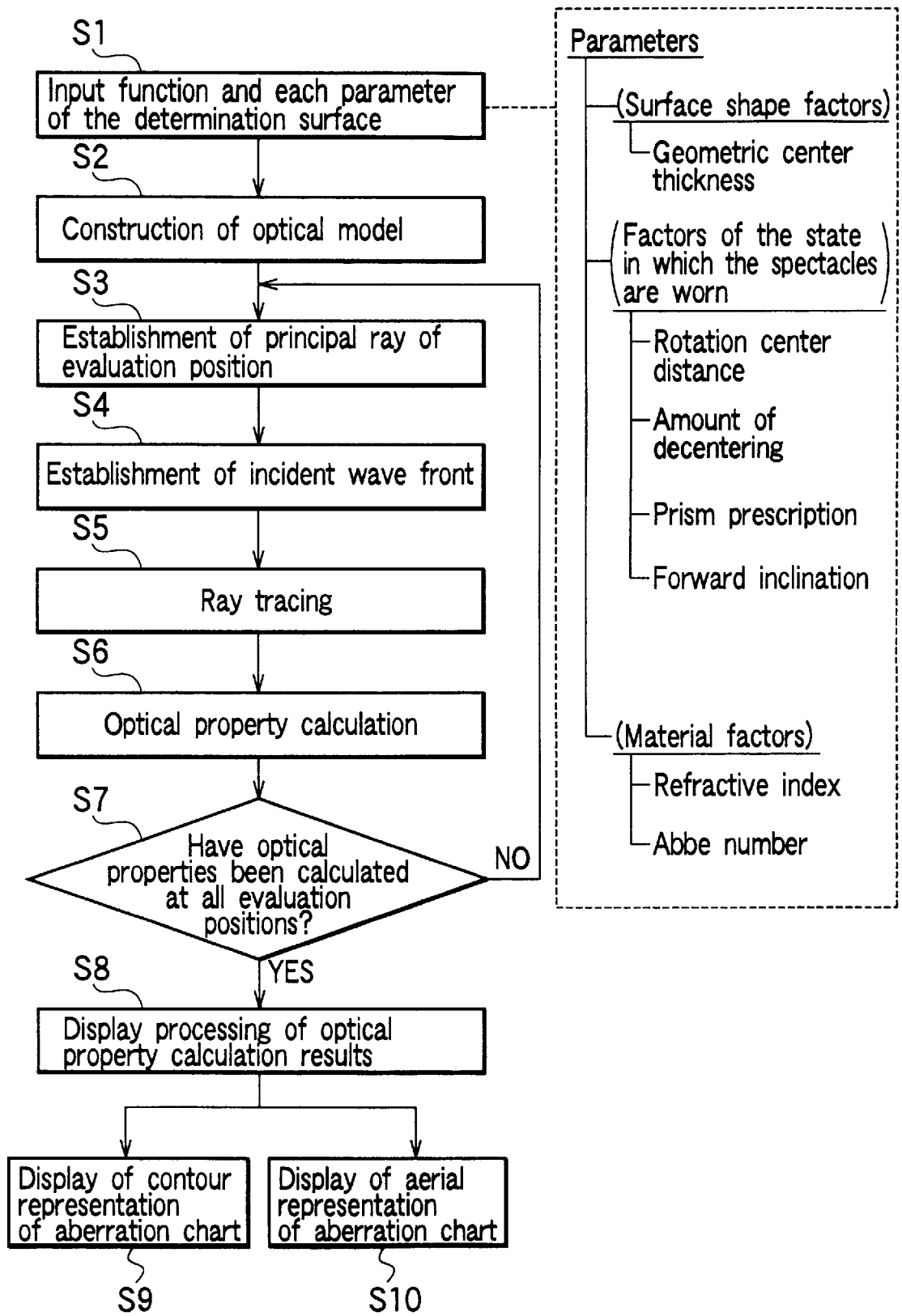
FIG. 3 is a flow chart showing the processing details of calculating optical properties of a spectacle lens and displaying the calculation results.

Next, the details of calculating optical properties of the spectacle lens and displaying these calculation results are described in accordance with the flow in FIG. 3.

Figure 4:
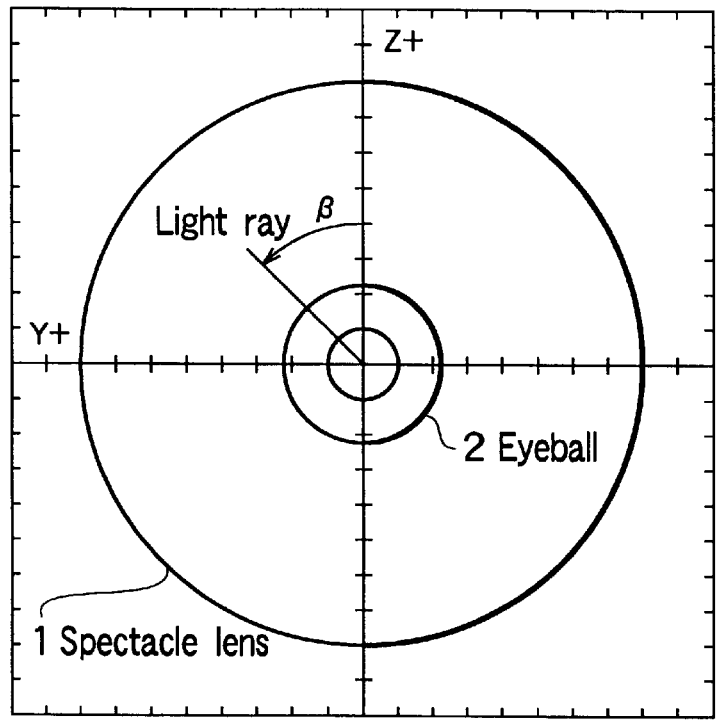
FIG. 4 is a graph showing the coordinate system of an optical model when the spectacle lens is worn when the optical properties of the spectacle lens are found.
Figure 5:
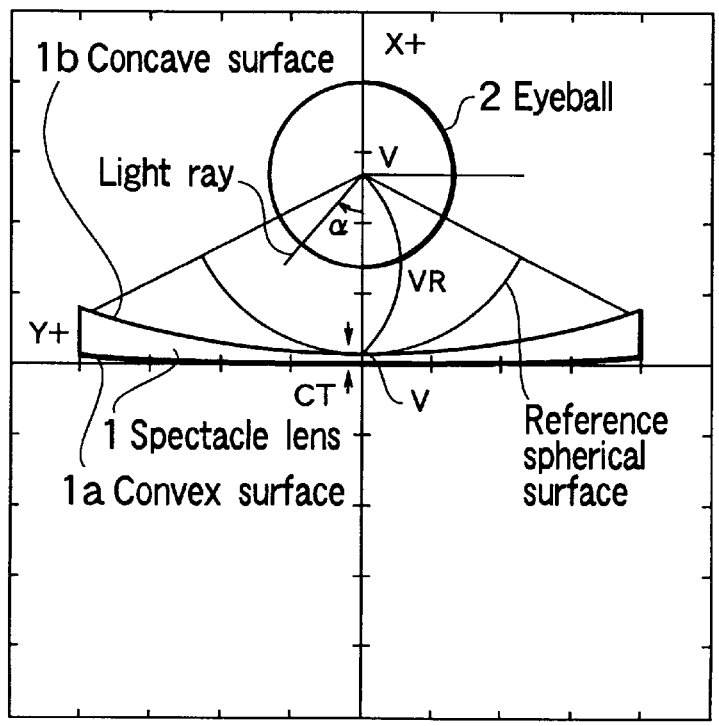
FIG. 5 is a graph showing the coordinate system of an optical model when the spectacle lens is worn when the optical properties of the spectacle lens are found.

First, the Input of the spline function for the measured surfaces (convex surface, concave surface) of the spectacle lens and parameters, such as parameters of state in which the spectacle lens is worn, etc., are input (step S1). The XYZ coordinate system is defined as shown in FIGS. 4 and 5, with the straight line that passes through the center of rotation of the eyeball serving as the X axis. FIG. 4 is a side view and FIG. 5 is a front view.

The method was used whereby 2-dimensional discrete data is fit into a spline function using the two-dimensional spline function (refer to Yoshimoto, Fujishi et al., 'Spline function and its application,' volume 5, Feb. 1, 1985, Kyoiku Shuppan, etc.) was used for conversion to a spline function.

The two-dimensional spline function is written as $$S(x, y) = \sum_{i=1}^{h+m}\sum_{j=1}^{k+m} c_{ij}N_{mi}(x)N_{mj}(y)$$

Here, $N_{mj}(x)$ and $N_{mj}(y)$ are the normalized B-spline function of m steps as defined by $$N_{mi}(x)=(\xi_{i}-\xi_{i-m})M_{mi}(x), N_{mj}(y)=(\eta_{j}-\eta_{j-m})M_{mj}(y)$$

Furthermore, in the above-mentioned formulas, m is the number of steps, h+2m is the number of knots in direction x, $\zeta$ i is the defined position of the nodal point in the direction x, k+2m is the number of knots in the direction y, $n_1$ is the defined position of the knots in the direction y, and $c_{ij}$ is the coefficient.

Convex surface 1a and concave surface 1b of spectacle lens 2 are fit to the spline function of the above-mentioned formula. When the shape coefficient of convex surface 1a is F (Y,Z) and the shape function of concave surface 1b is G (Y, Z), the height of the convex surface and concave surface (X coordinate position) at any point (Y1, Z1) can be represented by the following F(Y1, Z1) and G(Y1, Z1):

F(Y1, Z1)=ΣCijNmi(Y1)Nmj(Z1)

G(Y1, Z1)=ΣDijNmi(Y1)Nmj(Z1)

Here, Nmi(Y) and Nmj(Z) are functions that are dependent on the knots, which is characteristic of the spline function. Moreover, Cij and Dij are coefficients that are obtained when the shape is fit to the spline function and they are found using the method of least squares.

With respect to the input of each parameter, when it is necessary to calculate thickness of the spectacle lens at the geometric center (CT), which is a shape factor, as well as distance from the center of rotation (VR), decentering, prism prescription, and forward inclination, which are factors of the state in which the spectacle lens is worn, and lens refractive index (n) and chromatic abberation, which are material factors of the lens, each Abbe number is input as the respective parameter. Furthermore, center thickness (CT) of the lens, prism value, forward inclination, decentering and the distance from the center of rotation of the eyeball (VR) are necessary to construct the following optical model. Moreover, the refractive index (n) and Abbe number rare necessary for the ray tracing that is described below.

Next, an optical model for state in which the spectacle lens is worn is constructed (step S2). This is because it is not possible to correctly evaluate optical properties of the spectacle lens when it is worn unless state in which the spectacle lens is worn, that is, the position relationship of the spectacle lens when worn with the center of rotation R of the eyeball (optical model when the spectacle lens is worn) has been determined.

Figure 6:
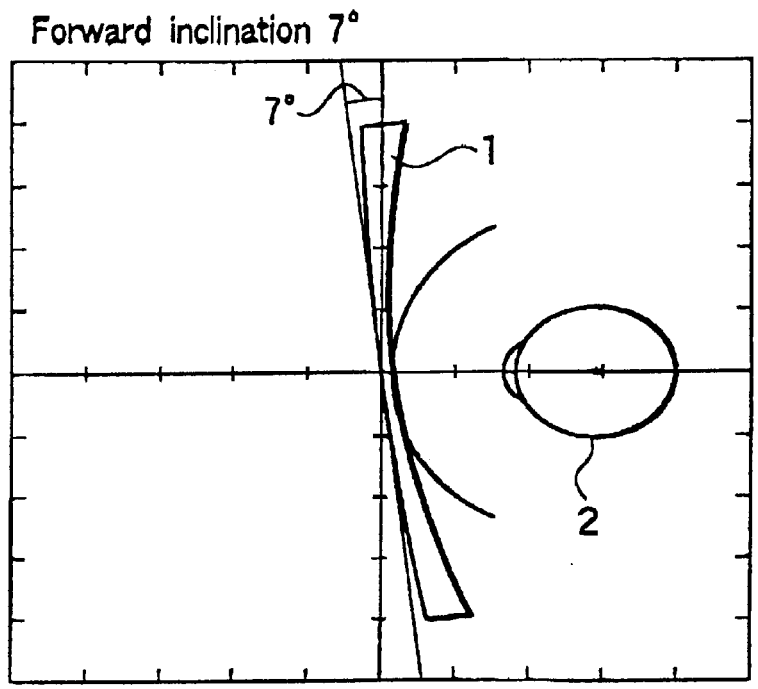
FIG. 6 is a graph of each optical model when the spectacle lens is worn when the values of the angle of forward inclination of the spectacle lens are different.
Figure 7:
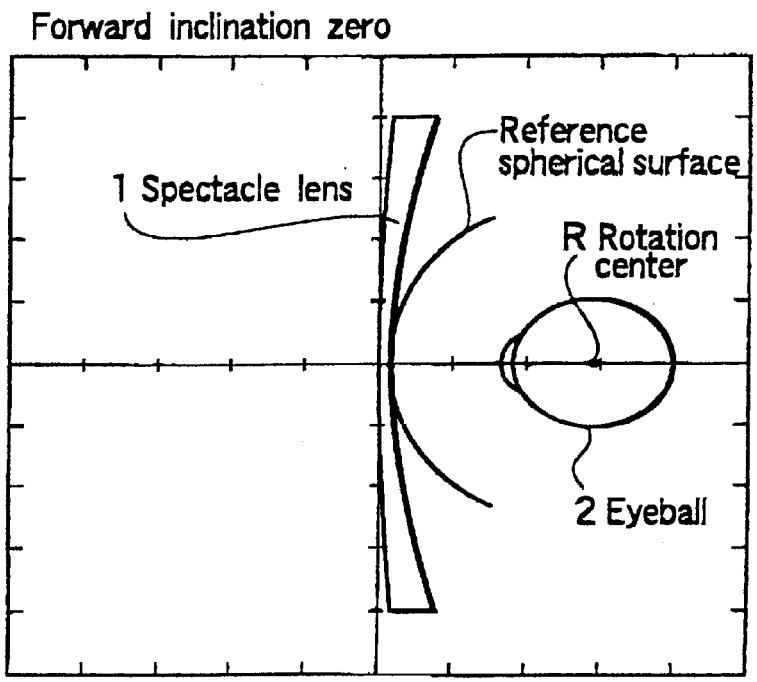
FIG. 7 is a graph of each optical model when the spectacle lens is worn when the values of the angle of forward inclination of the spectacle lens are different.
Figure 8:
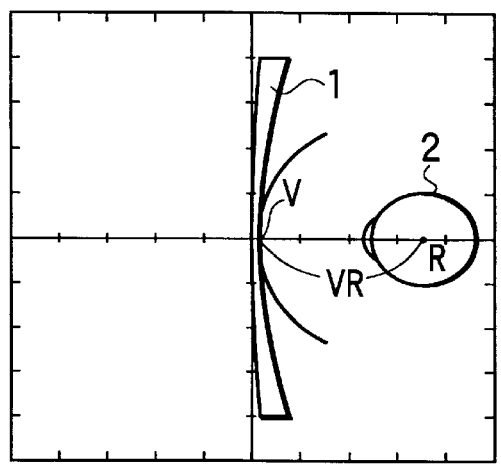
FIG. 8 is a graph of each optical model when the spectacle lens is worn when the distances from the center of rotation are different.
Figure 9:
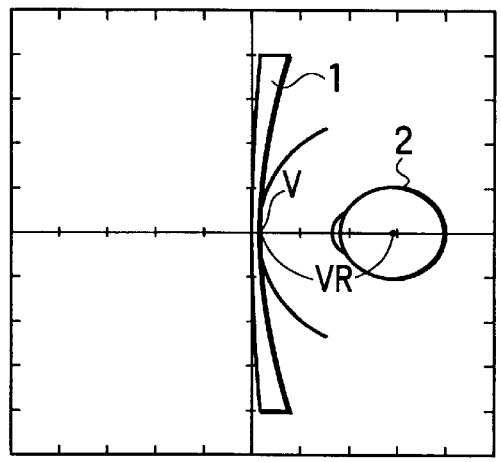
FIG. 9 is a graph of each optical model when the spectacle lens is worn when the distances from the center of rotation are different.
Figure 10:
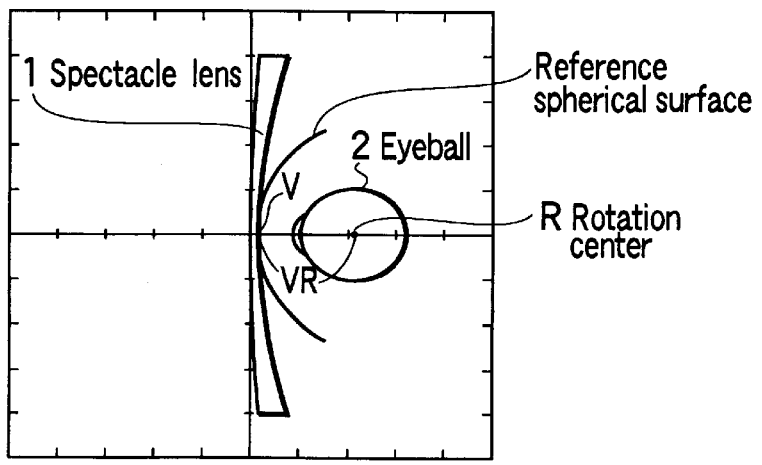
FIG. 10 is a graph of each optical model when the spectacle lens is worn when the distances from the center of rotation are different.

This optical model uses each factors of the state in which the spectacle lens is worn comprising prism value, forward inclination of the spectacle lens, decentering (prescription), distance from the center of rotation, etc., as the parameters. Consequently, even if the same spectacle lens is being handled, the optical model will vary with individual differences in each parameter. For instance, the optical model based on the forward inclination of spectacle lens 1 differs as shown in FIGS. 6 and 7. FIG. 6 shows the optical model when the forward inclination is zero and FIG. 7 shows the optical model when the forward inclination is 7 degrees. Moreover, FIGS. 8, 9, and 10 shows the optical model respectively when the spectacle lens is worn and the distance from the center of rotation is difference (distance from the center of rotation in FIGS. 8, 9, and 10 is 20 mm, 27 mm, and 34 mm, respectively).

Here, the parameter decentering (mm) is defined as follows: That is, decentering means that the eye point when the lens is worn slips (deviates) from the eye point in the design, but this decentering can mean the case where deviation is intentionally designed or the case where it is not intentional but occurs as a result. The case of unintentional decentering is the case where decentering occurs as the result of some type of error. In this case, the effect of decentering that may be produced as an error can be enumerated and confirmed by simulation with the amount of decentering serving as the parameter. Moreover, the case where decentering is intentionally designed is the following case: That is, the case where, for Instance, the spectacles feel better when they are worn off center because of the far vision portion and near vision portion of optical layout and other conditions in the case of progressive multifocal lenses is such a case. Furthermore, there are other cases of intentionally designed decentering, and the fact that it is possible to confirm optical properties in each case by simulation using decentering as a parameter for diverse decentering prescriptions is very meaningful. In particular, for instance, spectacle lenses for everyday use are designed using specific basic conditions for wearing the glasses, that are the norm as the model and therefore, there are cases where this lens design does not necessarily suit specific wearers. In such a case, it is possible to perform simulations with decentering as a parameter and discover the wearing conditions with which the best feel is obtained by selecting the appropriate amount of decentering.

Prism prescription is used as a parameter in order to obtain lenses corresponding to diverse prescriptions and a prism value other than the prescription value, such as the prism thinning, etc., can be input.

The forward inclination (°) of the frames is related to the shape of the frame and the way it is worn. An average value (y=7 to 80°) is generally used for this angle in designs of frames. However, there are cases where the actual way it is worn is different from this value. This is because of individual differences in how the frames are worn and the shape of the head. Moreover, it is also because a variety of frame designs have been seen in recent years and as a result, forward inclination has become diverse or has changed. Consequently, using the forward inclination of the frame as a parameter is effective in simulations of frames with different designs and the state in which they are worn.

The refractive index and Abbe number are determined by the lens material and using these as parameters is significant in terms of the material that is selected because it is possible to simulate, for instance, lenses with from a low refractive index to lenses with a high refractive index.

An optical model is constructed by defining the position of lens convex surface $1a$ and the position of the lens concave surface $1b$ on the XYZ coordinate system, the position of the center of rotation of the eyeball, and the position of a reference spherical surface (spherical surface where the distance from the center of rotation (VR) whose center is the center of rotation of the eyeball R serves as the radius; the power that is eventually found S is the inverse of the focal point distance from this reference spherical surface). For instance, when the center of convex surface $1a$ is placed at the origin of the coordinate and concave surface $1b$ is at the position of a shift in central thickness (CT) shift from this point, the following is realized by defining $F(Y,Z)$ and $G(Y,Z)$ on separate coordinate systems: That is, convex surface function F $(0,0)1$ coincides with the position of the origin and the center position of concave surface $1b$ in this coordinate system is G $(0,0)$+CT. Moreover, when the above-mentioned representation is used, the position of the center of rotation of the eyeball R in this coordinate system becomes VR+CT.

Next, the principal ray at the evaluation position where the optical properties of the spectacle lens will be evaluated is established (step S3). As shown In FIGS. 4 and 5, the vector specified by angle, which passes through the center of rotation R to become the X axis, and angle of rotation using the X axis as the axis of rotation is defined as the principal ray within the determination range for spectacle lens 1 and the principal ray at the evaluation position is established by setting the appropriate values for and Angle that becomes the X axis and angle of rotation (region of 360°) around the X axis as the axis of rotation were both at a 5° pitch in the actual calculation examples.

Figure 11:
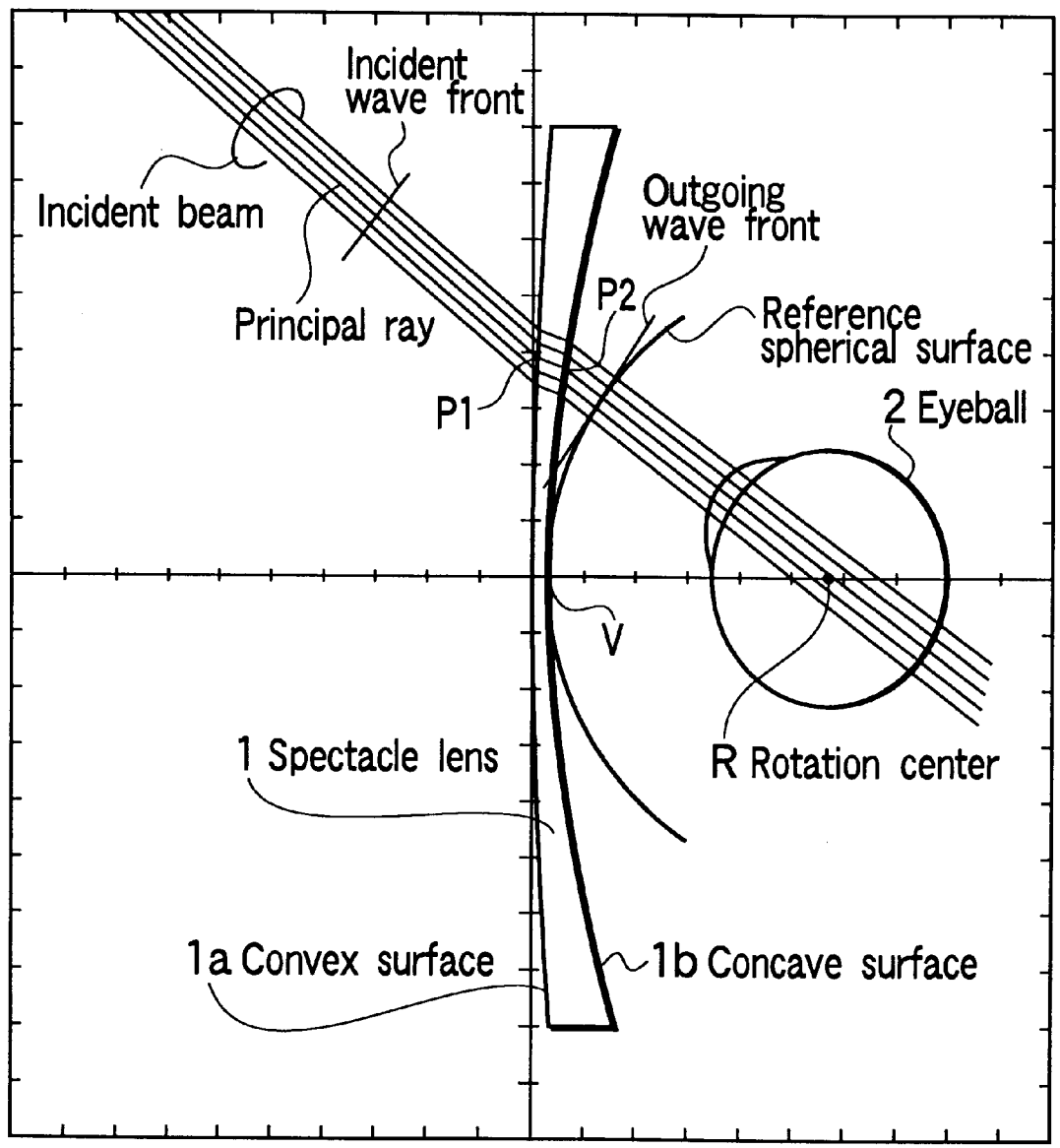
FIG. 11 is a diagram explaining ray tracing and optical properties of beams that comprise the principal ray that passes through the center of rotation.
Figure 12:
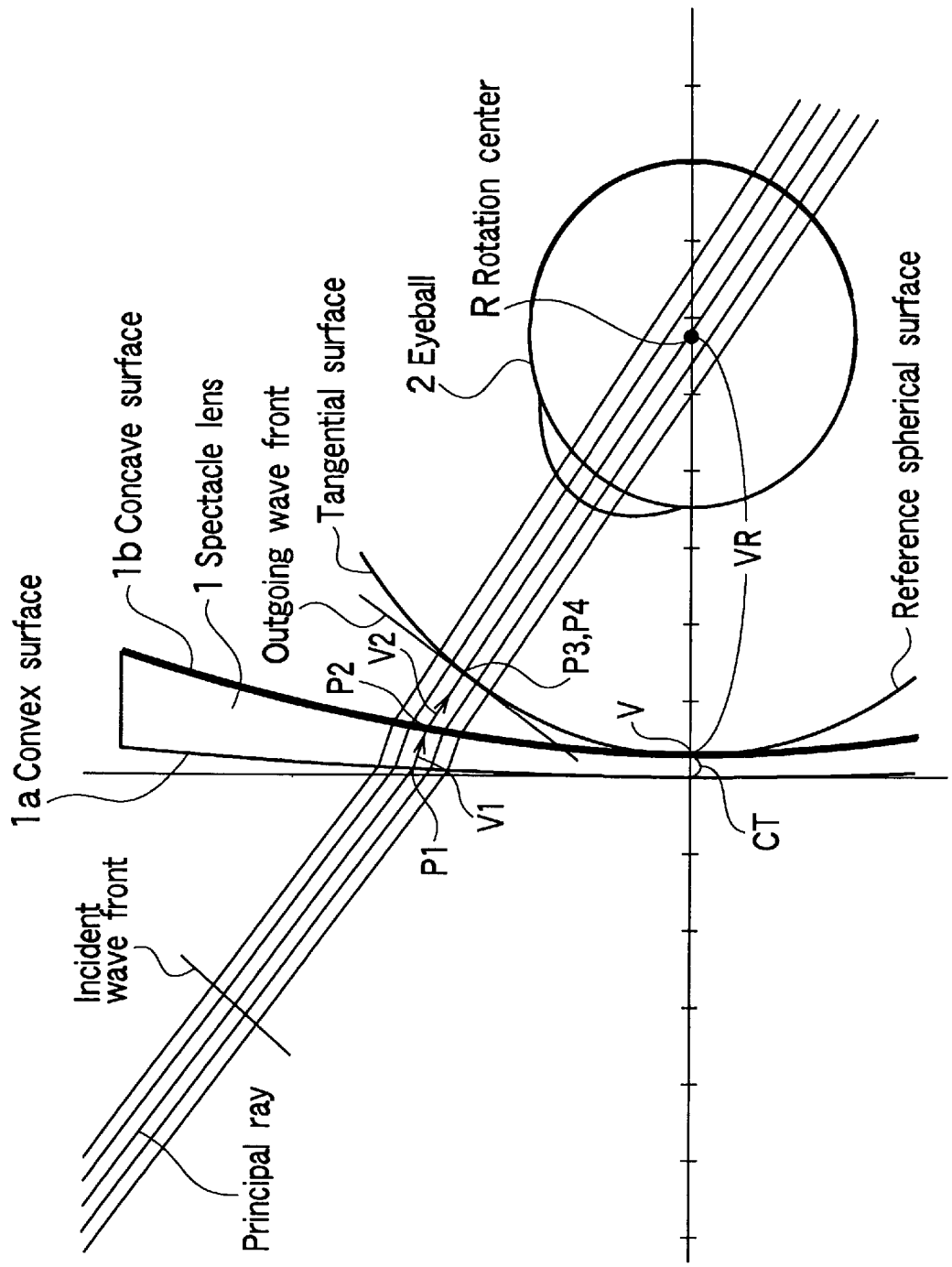
FIG. 12 is an enlarged view of part of FIG. 11.

Next, the incident wave front for incident beams that comprises the principal ray that hits the spectacle lens is established as shown in FIGS. 11 and 12 in order to find optical properties within the radius where the beans with the principal light ray hit the spectacle lens (step S4). The inventors decided to include the plane wave in the incident wave front of this example. However, optical properties can also be found when the incident wave front is a spherical wave. The case of a plane wave can be considered the case where many light rays hit parallel to the principal light ray and therefore, one principal ray was designed so that ray groups with a of 5 mm would hit at intervals of 0.5 millipitch.

Next, ray tracing is performed using Snell's law on each of the rays in the incident beam comprising the incident wave front that has been established (step S5). Each ray of the incident beam can be easily found using inverse ray tracing by using Snell's law. The data (figures) obtained by ray tracing are (1) passage point P1 (X1, Y1, Z1) on the lens convex surface and refracted light vector V1 (XV1, YV1, ZV1) at passage point P1, (2) passage point P2 (X2, Y2, Z2) on a lens convex surface and the refracted light vector V2 (XV2, YV2, ZV2) at passage P2, (3) passage point P3 (X3, Y3, Z3) on the tangential plane adjoining the reference spherical surface, and (4) passage point P4 (X4, Y4, Z4) on the reference spherical surface for each of the rays.

Furthermore, the vector of the rays is always V2 (XV2, YV2, ZV2) for passage points P3 and P4 in (3) and (4). Moreover, the above-mentioned passage points and vectors are shown only for the principal rays in FIGS. 11 and 12.

Next, optical properties at the established position on the spectacle lens are calculated from the wave front obtained from the above-mentioned ray tracing (step S6). Optical properties are found from changes in the incident wave front of the incident beam that hits the spectacle lens from the object side and changes in the outgoing wave front when light passes through the spectacle lens and reaches a reference spherical surface whose radius is the distance from the center of rotation, from the center of rotation to the back side of the lens.

The Zernike polynomial was used to find optical properties from passage point P3 (X3, Y3, Z3) and refracted light vector V2 (XV2, YV2, ZV2) obtained by light tracing. The method was adopted whereby optical properties are found from a polynomial coefficient by representing the shape of the wave front with the Zernike polynomial. Wave front W is represented as follows by the Zernike polynomial:

$$W \approx \Sigma a \cdot Ze$$

Here, a is the Zernike coefficient and Ze is the Zernike polynomial.

The results found by ray tracing are not at the position of the wave front, but because the refracted light vector implies the normal direction of the wave front, coefficient a is found by solving ti $P \approx \Sigma a \cdot \delta Ze/\delta Y$ $$Q \approx \Sigma a \cdot \delta Ze/\delta Z$$

(p and Q are the gradients of the wave front.) and optical properties are found from coefficient a.

Next, it is assessed whether or not the above-mentioned optical properties have been calculated for all of the established evaluation positions (step S7) and above-mentioned step S3 to step S6 are repeated and optical properties are calculated until the optical properties for all evaluation positions are found.

Once calculation of the optical properties has been completed, display processing of the results of calculating the optical properties is performed (step S8) and a contour representation of the abberation chart and an aerial representation of the abberation chart are printed out on the printer or display (step S9, S10). Furthermore, a 2-dimensional representation of the aberration chart can also be displayed.

The three-dimensional shape of a spectacle lens is measured as previously explained and therefore, optical properties of the spectacle lens in any position of rotation or at any position on the convex surface or the concave surface of the lens within the measured region can be calculated. In particular, it is easy to calculate the optical properties because the lens surface has been made into a spline function.

Moreover, distance from the center of rotation of the eyeball (VR), decentering, prism prescription, forward inclination, etc., are defined as factors of the state in which the spectacle lens is worn and an optical model is built by calculation using these values as parameters and therefore, it is not necessary to re-measure the lens, even if the state in which it is worn changes.

For example, it is possible to numerically convert and confirm the effect of decentering that may be mistakenly produced by using the amount of decentering (mm) as a parameter. Moreover, although there are times where progressive multifocal lenses, etc., feel better when they are actually worn off center, optical properties are confirmed, even for this type of eccentric prescription, and therefore, it is possible to realize optimum comfort without re-measuring.

Moreover, prism prescription is used as a parameter and therefore, optical properties can be found that can match diverse prescriptions, and even for prism values other than prescription, such as prism thinning.

Furthermore, because the frame forward inclination is used as a parameter, it is possible to simulate frames of various designs and how they are worn.

By using the refractive index and Abbe number as parameters, it is possible to simulate lenses, ranging from low refractive index lenses to high refractive index lenses.

Furthermore, optical properties when spectacle lenses are worn were calculated in the above-mentioned embodiment based on three-dimensional determination of both sides (convex surface and concave surface) of the spectacle lens, but optical properties can be calculated and evaluated for semi-finished lenses where only the convex surface has been finished. That is, it is possible to simulate the optimum convex surface shape and obtain the optimum prescription by measuring the convex surface of a semi-finished lens to obtain the three-dimensional shape data and selecting and simulating any design for the surface shape of the concave surface, for instance, a spherical surface, aspherical surface, toric lens, a free curved surface, a curve that takes into consideration optical aberration, etc., Thus, the present invention can be used as long as the three-dimensional determination data for one, the convex surface or the concave surface, of the two sides of the spectacle lens are obtained.

Next, an example of actually performing three-dimensional determination of a progressive multifocal lens and finding optical properties at the center of the point of rotation will be described.

The convex surface and the concave surface of a progressive multifocal lens were measured with a three-dimensional determination device. This determination was performed by scanning at a pitch of 1 mm and a convex surface of 35 mm and concave surface of 33 mm under a speed of 4 mm/sec. Moreover, noise-cutting processing and offset processing calculations were performed on the measurements. Spline function was obtained by fitting 29 knots in the X and Y directions to spline functions in 6 steps within the region of ±35 mm of the convex surface. Moreover, 24 knots in the X and Y directions were fit to spline functions in 6 steps within a region of ±33 mm of the concave surface. The following input parameters were used for calculation of optical properties:

| | |
|---|---:|
| Lens center thickness | 7.20 mm |
| Refractive index | 1.501 |
| Abbe number | 58 |
| Amount of decentering | 0.0 |
| Prism prescription value | 0.00 |
| Forward inclination | 0.00 |
| Distance from the center of rotation | 27 mm |

Figure 13:
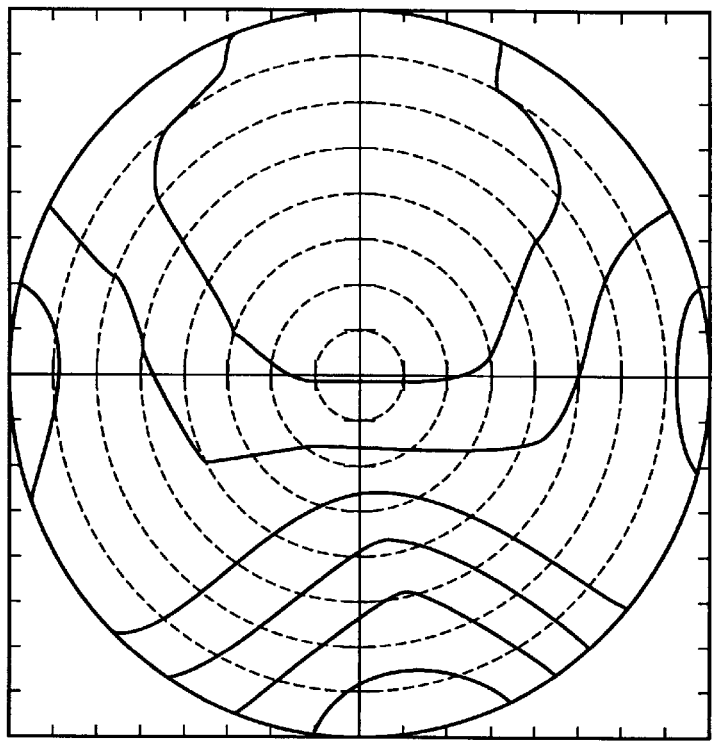
FIG. 13 is an aberration chart that shows the results of calculating optical properties of progressive multifocal lenses.
Figure 14:
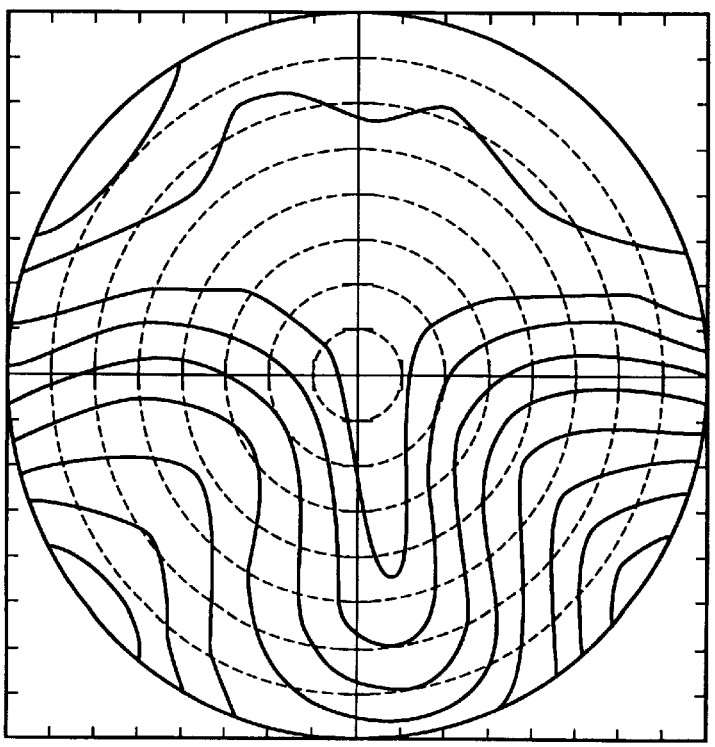
FIG. 14 is an aberration chart that shows the results of calculating optical properties of progressive multifocal lenses.
Figure 15:
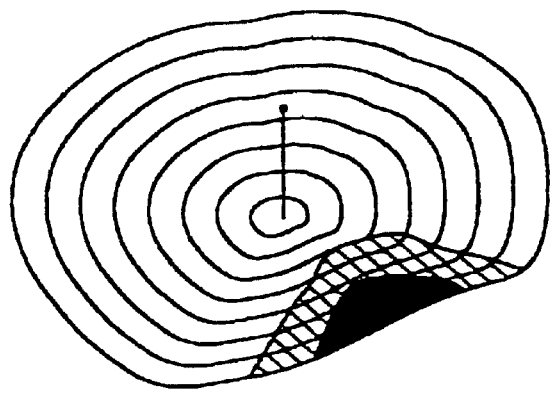
FIG. 15 is an aberration chart that shows the results of calculating optical properties of progressive multifocal lenses.
Figure 15:
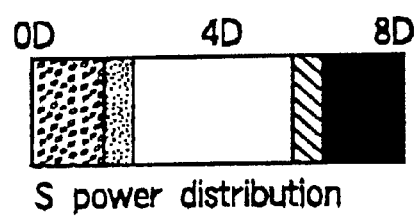
Figure 16:
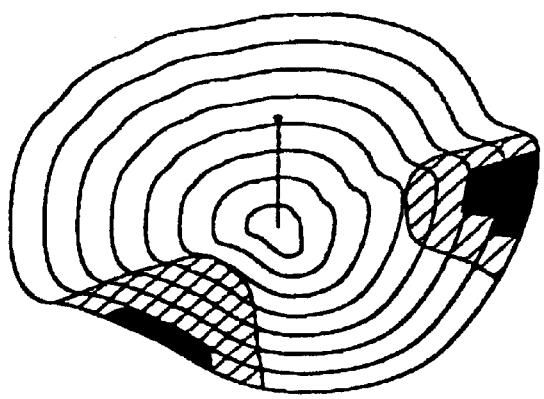
FIG. 16 is an aberration chart that shows the results of calculating optical properties of progressive multifocal lenses.
Figure 16:
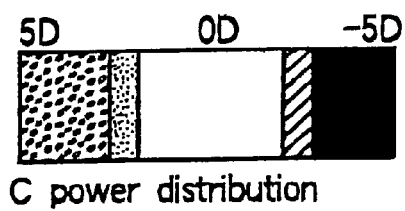

Data that were calculated under these conditions are shown in FIGS. 13 through 16. FIG. 13 is the S power distribution chart (average power) and FIG. 13 is the C power (cylindrical power) distribution chart. The concentric circle drawn with a dotted line in FIGS. 13 and 14 represents rotation angle and is placed at a 5° pitch. Moreover, pitch of the contour is 0.5 D (dioptry). In addition, FIG. 15 is an aerial view corresponding to the S power distribution of FIG. 13 and FIG. 16 is an aerial view corresponding to the C power distribution in FIG. 14. Moreover, FIG. 17 shows the numeric data for the S power (dioptry) (Dptr)), C power (dioptry (Dptr)), and AX (astigmatism axis. degrees (Deg)) (in the case of β=90°, angle of rotation α=value within a range of −45°−+45°).

As previously explained, by means of the present invention, the state in which a spectacle lens is worn, that is, the position relationship of the spectacle lens with the center of rotation of the eyeball (optical model when the spectacle lens is worn), is determined from the three-dimensional data of the spectacle lens and the parameters for the state in which the spectacle lens is worn, and the optical properties at each position on the spectacle lens relating to the principal ray, or the beam comprising the principal ray, in the direction of the line of vision that passes through the center of rotation of the eyeball is found from this relationship. Therefore, it is possible to find more appropriate and correct optical properties of a spectacle lens that correspond to the state in which the spectacle lens is actually worn by a spectacle wearer.

Moreover, the spectacle lens is evaluated using its three-dimensional shape data and therefore, it is possible to calculate optical properties of the spectacle lens at any position on the spectacle lens. Furthermore, the state in which the spectacle lens is worn is determined and calculations are performed using parameters of the state in which the spectacle lens is worn comprising the distance from the center of rotation of the eyeball, and therefore, optical properties can be evaluated without re-measuring, even if the state in which the spectacle lens is worn changes.

Moreover, by means of the present invention, it is possible to simulate optical properties and obtain the optimum prescription by giving any design value to the shape of one surface of the spectacle lens when the surface shape of the other surface of the spectacle lens has already been obtained. Moreover, it is also possible to treat prism values other than prescription, such as prism thinning, as a parameter that can be input.

What is claimed is:

1. A method of evaluating a spectacle lens, comprising the steps of:

finding the optical properties of each position on a spectacle lens relating to the principal ray, or beam comprising the principal ray, that passes through the center of rotation of the eyeball from the three-dimensional data of the spectacle lens, the parameters for the state in which the spectacle lens is worn comprising distance from the surface of said spectacle lens on the eye side to the center of rotation of the eyeball as a parameter, and the material parameters of the spectacle lens comprising the index of refraction of said spectacle lens as a parameter; and evaluating the spectacle lens.

2. The method of evaluating a spectacle lens according to claim 1, wherein in addition to the distance between the surface of the spectacle lens on the eye side and the center of rotation of the eyeball, the parameters for the state of use of said spectacle lens comprise the decentering, prism prescription, and forward inclination.

3. The method of evaluating a spectacle lens according to claim 2, wherein the determination of the three-dimensional surface shape of the spectacle lens as determined with a contact-type three-dimensional determination device that uses Atomic Force Probe serves as the three-dimensional data of said spectacle lens.

4. The method of evaluating a spectacle lens according to claim 2, wherein the surface shape of the spectacle lens of the three-dimensional shape data of said spectacle lens is converted to a spline function.

5. The method of evaluating a spectacle lens according to claim 2, wherein optical properties at each position of said spectacle lens are found by ray tracing the principal ray, or beam comprising the principal ray, that passes through the center of rotation of said eyeball.

6. The method of evaluating a spectacle lens according to claim 1, wherein the determination of the three-dimensional surface shape of the spectacle lens as determined with a contact-type three-dimensional determination device that uses Atomic Force Probe serves as the three-dimensional data of said spectacle lens.

7. The method of evaluating a spectacle lens according to claim 6, wherein the surface shape of the spectacle lens of the three-dimensional shape data of said spectacle lens is converted to a spline function.

8. The method of evaluating a spectacle lens according to claim 6, wherein optical properties at each position of said spectacle lens are found by ray tracing the principal ray, or beam comprising the principal ray, that passes through the center of rotation of said eyeball.

9. The method of evaluating a spectacle lens according to claim 1, wherein the surface shape of the spectacle lens of the three-dimensional shape data of said spectacle lens is converted to a spline function.

10. The method of evaluating a spectacle lens according to claim 9, wherein optical properties at each position of said spectacle lens are found by ray tracing the principal ray, or beam comprising the principal ray, that passes through the center of rotation of said eyeball.

11. The method of evaluating a spectacle lens according to claim 1, wherein optical properties at each position on said spectacle lens are found by ray tracing the principal ray, or beam comprising the principal ray, that passes through the center of rotation of said eyeball.

12. A spectacle lens evaluation device comprising:
a three-dimensional determination device that determines the surface shape of the spectacle lens;
a computer that calculates the optical properties of the spectacle lens from various data of said spectacle lens; and
an output device that displays the results of evaluating optical properties of the spectacle lens that have been calculated by the computer,
wherein the above-mentioned computer has a three-dimensional shape data input part that inputs data relating to the three-dimensional shape of the spectacle lens comprising the determination of said 3-dimensional determination device, an input part that inputs parameters of the state in which the spectacle lens is worn comprising the distance between the surface of said spectacle lens on the eye side and the center of rotation of the eyeball as a parameter, and a material parameter input part that inputs material parameters of the spectacle lens comprising the refractive index of said spectacle lens as a parameter, as well as a processing part that calculates optical properties at each position on the spectacle lens relating to the principal ray, or the beam comprising the principal ray, that passes through the center of rotation of said eyeball based on data from these input parts.

13. The spectacle lens evaluation device according to claim 12, wherein said three-dimensional determination device is a contact-type three-dimensional determination device that uses Atomic Force Probe.

14. The spectacle lens evaluation device according to claim 13, wherein said processing part has a function processing part that converts the shape of the surface of said spectacle lens from the input from said 3-dimensional shape data input part to a spline function.

15. The spectacle lens evaluation device according to claim 13, wherein said processing part has a coordinate transformation processing part that transforms coordinates in order to change modifying the relative position relationship between said beam and the spectacle lens when finding the optical properties of each position on said spectacle lens by ray tracing the principal ray, or the beam comprising the principal ray, that passes through the center of rotation of said eyeball.

16. The spectacle lens evaluation device according to claim 12, wherein said processing part has a function processing part that converts the shape of the surface of said spectacle lens from the input from said 3-dimensional shape data input part to a spline function.

17. The spectacle lens evaluation device according to claim 16, wherein said processing part has a coordinate transformation processing part that transforms coordinates in order to change modifying the relative position relationship between said beam and the spectacle lens when finding the optical properties of each position on said spectacle lens by ray tracing the principal ray, or the beam comprising the principal ray, that passes through the center of rotation of said eyeball.

18. The spectacle lens evaluation device according to claim 6, wherein said processing part has a coordinate transformation processing part that transforms coordinates in order to change modifying the relative position relationship between said beam and the spectacle lens when finding the optical properties of each position on said spectacle lens by ray tracing the principal ray, or the beam comprising the principal ray, that passes through the center of rotation of said eyeball.

* * * * *

UNITED STATES PATENT AND TRADEMARK OFFICE
CERTIFICATE OF CORRECTION

PATENT NO.   : 6,222,621 B1
DATED        : April 24, 2001
INVENTOR(S)  : Shinichiro Taguchi Page 1 of 1

It is certified that error appears in the above-identified patent and that said Letters Patent is hereby corrected as shown below:

<u>Title page,</u>
Item [30]     Foreign Application Priority Data
Please insert the following Foreign Application Priority Data:
Oct. 12, 1998   [JP]     Japan 10-289895
Oct. 08, 1999   [JP]     Japan 11-288231

Item [73] Assignee
Please change the spelling of the Assignee's name from "Hoyo" to -- Hoya --.

<u>Claim 11,</u>
Line 2, change "on" to -- of --.

<u>Claim 18,</u>
Line 2, change "6" to -- 12 --.

Signed and Sealed this

Twelfth Day of March, 2002

Attest:

*Attesting Officer*

JAMES E. ROGAN
*Director of the United States Patent and Trademark Office*